United States Patent [19]
Kawauchi et al.

[11] Patent Number: 5,647,024
[45] Date of Patent: Jul. 8, 1997

[54] MULTI DIMENSIONAL IMAGE COMPRESSION AND DECOMPRESSION METHOD USING FEATURE POINTS ON A LUMINANCE CONTOUR LINE

[75] Inventors: Masayo Kawauchi, Kamakura; Yoshiko Hozumi, Zushi; Kyoichi Shimizu, Yokohama, all of Japan

[73] Assignee: Victor Company of Japan, Ltd., Yokohama, Japan

[21] Appl. No.: 403,249

[22] Filed: Mar. 10, 1995

[30] Foreign Application Priority Data

Mar. 12, 1994 [JP] Japan ................... 6-067882

[51] Int. Cl.$^6$ ............... G06K 9/36; G06K 9/46
[52] U.S. Cl. .......... 382/232; 382/233; 382/242; 382/250
[58] Field of Search ............ 382/232–243, 382/248, 250, 166, 197, 199; 348/241–242, 390–391, 396, 405, 409, 411, 384–449, 571, 700; 358/426, 428, 432–433, 448

[56] References Cited

U.S. PATENT DOCUMENTS

| | | | |
|---|---|---|---|
| 4,189,711 | 2/1980 | Frank | 340/146.3 |
| 4,908,872 | 3/1990 | Toriu et al. | 382/242 |
| 5,025,478 | 6/1991 | Morris et al. | 382/199 |
| 5,091,976 | 2/1992 | Murayama | 382/242 |
| 5,204,920 | 4/1993 | Moran et al. | 382/166 |
| 5,226,093 | 7/1993 | Iwase | 382/236 |
| 5,247,590 | 9/1993 | Fukuhara et al. | 382/243 |
| 5,295,201 | 3/1994 | Yokohama | 382/236 |
| 5,333,012 | 7/1994 | Singhal et al. | 348/405 |
| 5,357,602 | 10/1994 | Ohta | 395/142 |
| 5,394,191 | 2/1995 | Sirat et al. | 348/571 |
| 5,428,693 | 6/1995 | Murakami et al. | 382/232 |
| 5,459,513 | 10/1995 | Oddou | 348/397 |

FOREIGN PATENT DOCUMENTS

| | | |
|---|---|---|
| 0164825 | 12/1985 | European Pat. Off. . |
| 2-263277 | 10/1990 | Japan . |
| 5-167998 | 7/1993 | Japan . |

OTHER PUBLICATIONS

Systems and Computers in Japan, vol. 16, No. 4, 1985, "A Coding Method of Gray-Valued . . . ", Nakajima et al.
Gonzalez Woods, "Digital Image Processing", 1992 by Addison-Wesley, pp. 511–514.
Ran et al., "A Perceptually Motivated Three-Component Image Made–Part II" IEEE Transactions on Image Processing vol. 4, No. 4, Apr. 1995 pp. 430–447.
Marshall et al., "Contour Based Image Coding", IEE Colloquim on 'Low Bit Rate Image Coding' (Digest No. 075), pp. 4-1-4.4, 1990.

*Primary Examiner*—Leo Boudreau
*Assistant Examiner*—Phouc Tran
*Attorney, Agent, or Firm*—Jacobson, Price, Holman & Stern, PLLC

[57] ABSTRACT

A method of compressing and decompressing a multi-dimensional image. Video data including luminance data distributed at least in two-dimensions is compressed for subsequent coding. The resulting codes are decompressed to reproduce the video data. A specific number of representative pixels are extracted from a plurality of pixels consisting of the digital signal of the video data. Texture data is also extracted from the digital signal of the video data. The representative pixels and the texture data are coded. The coded representative pixels and the texture data are then decoded. The video data is reproduced using the decoded representative pixels and the texture data.

11 Claims, 12 Drawing Sheets

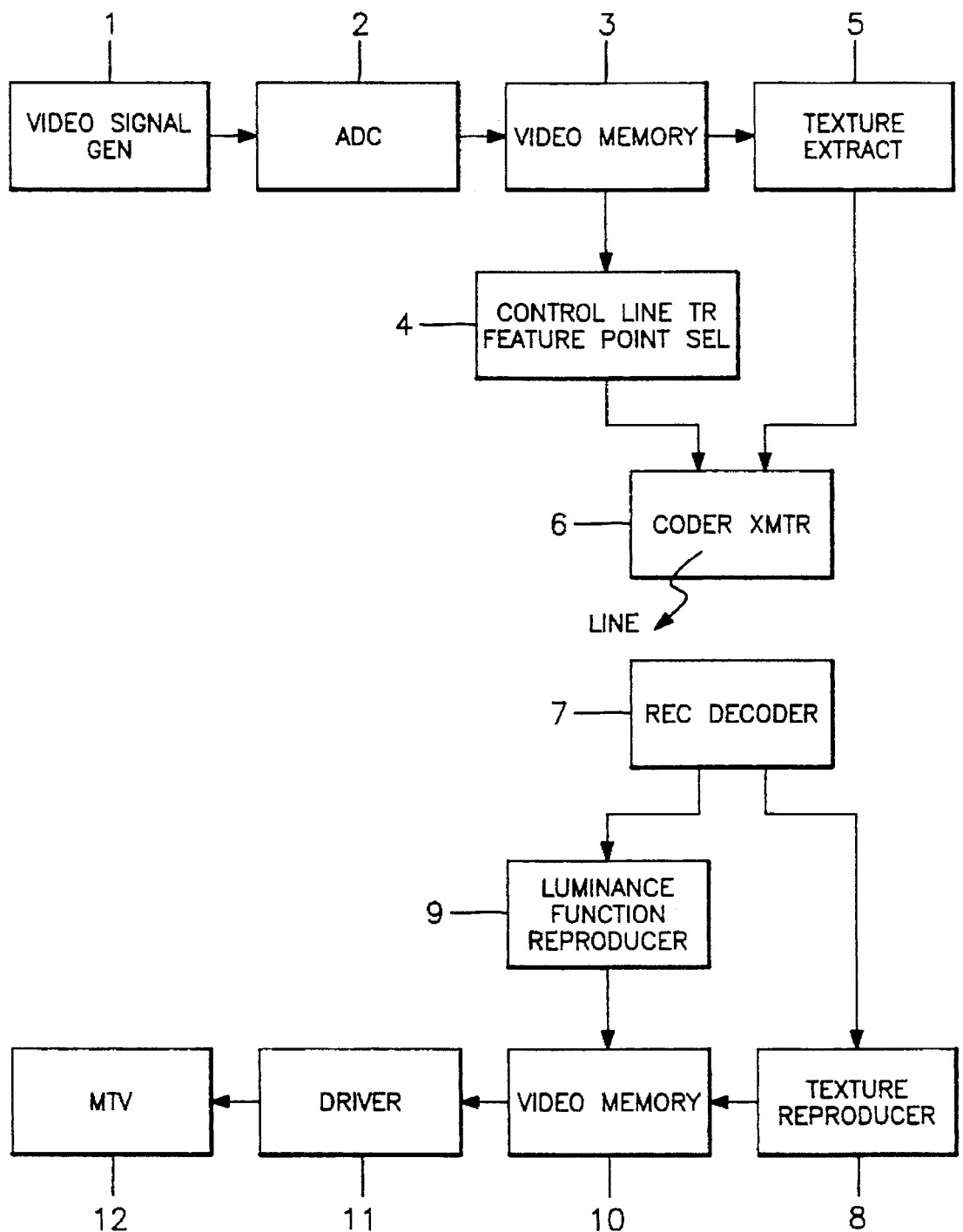

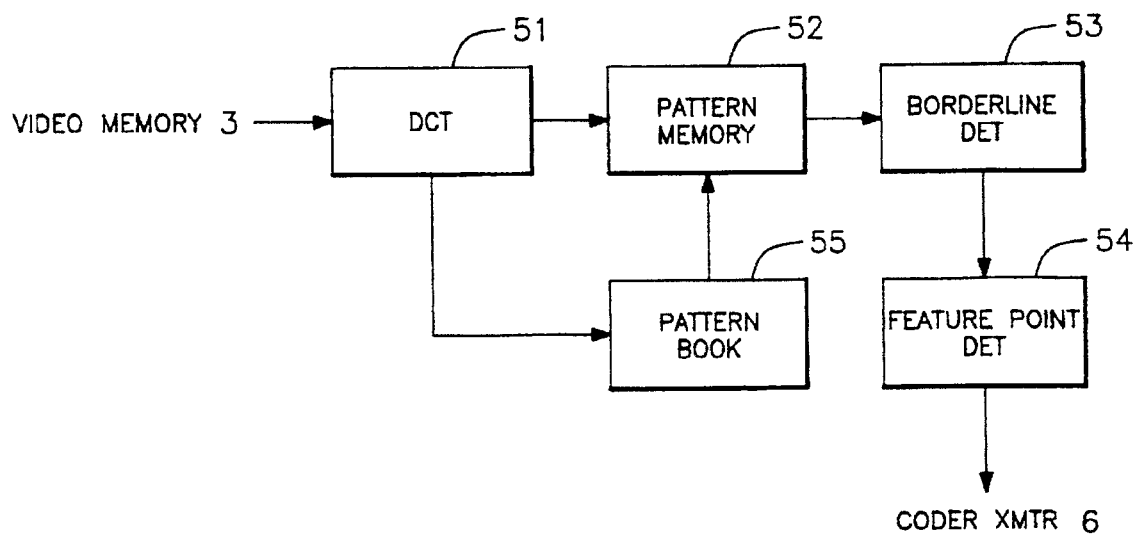
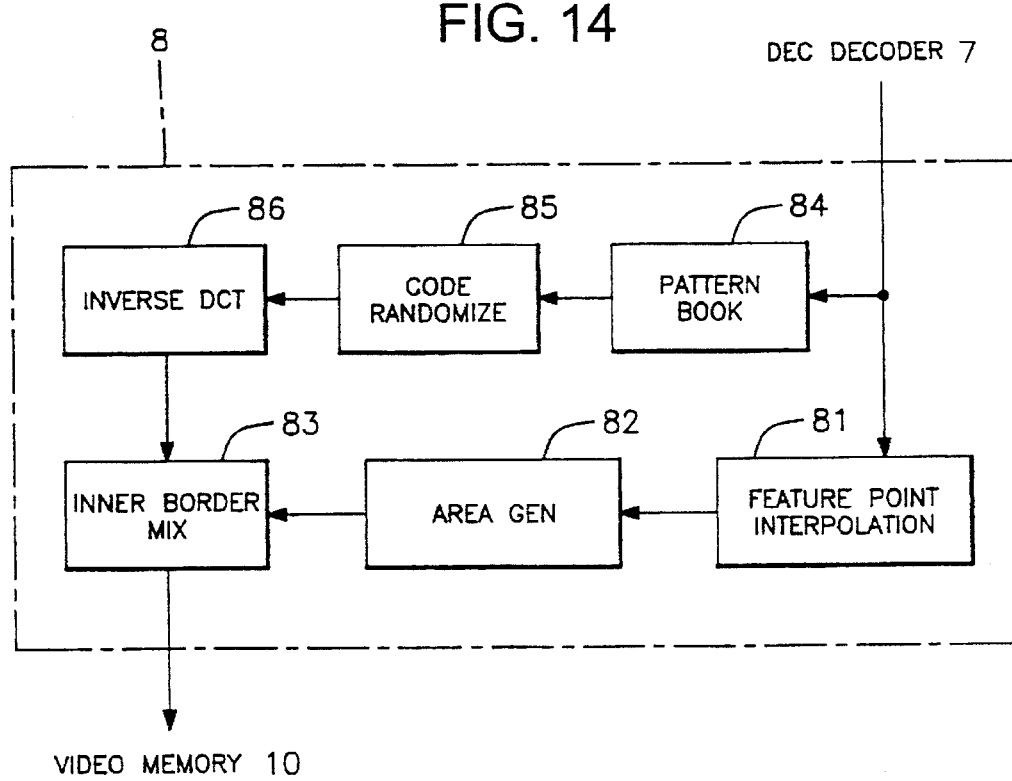

MULTI DIMENSIONAL IMAGE COMPRESSION AND DECOMPRESSION METHOD USING FEATURE POINTS ON A LUMINANCE CONTOUR LINE

BACKGROUND OF THE INVENTION

The present invention relates to a method of compressing and decompressing a multi-dimensional image. Particularly, the present invention relates to a method of effectively compressing and decompressing a multi-dimensional image for image transmission between apparatuses, such as, those having different types of data transmitters and receivers, in which pixels or frames on the time axis do not necessarily correspond to each other on the compression side and the decompression side.

Several methods of compressing image data have been proposed. For example, there is a linear (equal) contouring method in which the sampled values of a digitized video signal are equally divided into signal levels and the sampled values included in each signal level are replaced with a representative value. According to this method, an amount of data per natural image in the range of 6 bits (64 gradations) to 8 bits (256 gradations) is generally necessary in order to render negligible the differences between the representative values and original values. A lot of data thus should be processed per sampled value when a video signal digitized by equal quantization is merely recorded.

In a conventional method, digital data compressed by an effective coding method is recorded or transmitted and then reproduced or received, and decompressed to reproduce an image. In this method, human characteristics are exploited, such as vision or hearing, both of which are sensitive to only small changes not big changes in a signal portion. Alternatively, correlation is utilized between signals to be recorded on the time-spacial axis. Under such utilization, an image is divided into pixels and a few approximated values of the original image are transmitted using the level of correlation between luminance values of pixels close to each other. Alternatively, differences between pixels or frames are transmitted. An amount of data per sampled value may be decreased by decreasing frequency components using the fact that high frequency components are less prevalent in an image than low frequency components.

The conventional method mostly requires the number of pixels to be equal between the original and reproduced (decompressed) images because reproduction of divided pixels must be well reproduced. It is thus necessary that some pixels be interpolated or extracted after decompression when compression and decompression are conducted to images with different numbers of pixels. Consequently, this method depends, to some extent, on physical image components during reproduction, such as, the number of pixels, their shapes and the level of luminance, without selecting true data and reproducing the physical image components.

There is also the case wherein pixel density is extremely different in two images having different numbers of pixels. For example, an image taken by photographic equipment is used as a printing plate for an electric printer. The pixel density of the photographed image is at most 500×500 per image frame. Compared to this, the pixel density of the image for the electric printer is several thousand times that amount, which is extremely great. Aliasing occurs in this case even though the conventional method for the same number of pixels between two images is not employed.

Further, the case where interpolation is conducted without increasing the number of pixels, since a large interpolation area is filled with average values of weighted data, image deterioration due to interpolation distortion cannot be avoided.

If the pixel density of an original image is multiplied several thousand times, since correlation between images close to each other is extremely high, principally effective image compression is possible. However, the conventional method which requires that the original and reproduced (decompressed) images have the same number of pixels, cannot achieve a high compression ratio.

The applicant of the present invention has already proposed the following multi-dimensional image compressing and decompressing method which solves such problems.

Firstly, feature points (pixels) of an image to be processed are selected to obtain image data in which the image is compressed while disregarding the level of pixel density. When decompressing, the original image is reproduced not using the image data but using feature points, such as, positive and negative maximum curvature points of the luminance contour lines on the luminance function of the original image with luminance data that two-dimensionally spreads out or of luminance contour planes on the luminance function of the original image with luminance data that three-dimensionally (including the time-axis) spreads out, as if a new image is displayed on another pixel density plane.

Alternatively, pixels are selected as feature points when a difference between the approximate line (plane) of a luminance contour line (plane) on the luminance function and the luminance contour line (plane) on each pixel is greater than a predetermined reference value. The data of positions and luminance values of the feature points thus obtained are transmitted or recorded.

When the data of positions and luminance values is used in image reproduction, luminance data on pixels not corresponding to the feature points is decided in decompression using an interpolation plane or solid formed by means of feature points close to the pixels which are not the feature points.

Alternatively, a plurality of luminance data is selected from the luminance function of image data that three-dimensionally spreads out over axes with the time-axis. Pixels are selected as feature points when a difference between the approximate line of a luminance contour line on the luminance function for the selected luminance data and the luminance contour line is greater than a predetermined reference value. The data representative of positions and luminance values of the feature points thus obtained is transmitted or recorded.

When the data representative of positions and luminance values is used in image reproduction, luminance data on pixels which are not the feature points is decided in decompression using an interpolation solid formed by means of feature points close to the pixel which are not the feature points.

In this method, however, texture data on an object surface in an image is mostly neglected during data compression, because the texture exists in an extremely small part of the image even though it is a very important characteristic of the object.

The conventional method mostly requires that original and reproduced (decompressed) images have the same number of pixels because the divided pixels must be well reproduced. Further in the case of motion picture, this conventional method requires the same number of images or frames per second. However, when image reproduction is made by compressing the luminance function composed of pixels, the texture data which is a small part of an object surface is mostly neglected and an original image cannot be well reproduced.

In order to provide further improvement in compression ratio without requiring the number of pixels or frames on the time-axis to be the same before compression and after decompression, the luminance function is expressed with fewer parameters. When decompressing in this case, the luminance function is reproduced generally using simple interpolation lines, planes or solids. The texture of an object surface is barely reproduced in this case and decompressed image quality is very much deteriorated.

SUMMARY OF THE INVENTION

The purpose of the present invention is to provide an effective compression and decompression method with no problem such that texture data is lost.

The present invention provides a method of compressing and decompressing a multi-dimensional image such that digital video data including luminance data distributed at least in two-dimensions is compressed into codes, the codes being decompressed to reproduce the digital video data.

The method includes the steps of: extracting a specific number of representative pixels from a plurality of pixels consisting of the digital signal of video data; extracting texture data from the digital signal of video data; coding the representative pixels and the texture data; decoding the coded representative pixels and the texture data; and reproducing the digital video data using the decoded representative pixels and the texture data.

In the method, the coding step may include the step of orthogonally transforming the digital video data using discrete cosine transform techniques.

In the method, the pixel extracting step may include the steps of: tracing a luminance contour line in a luminance distribution function of the luminance data; obtaining a predetermined number of curvature values indicative of curvature of the luminance contour line; and comparing the curvature values with a reference value to designate at least a pixel corresponding to one of the curvatures values as a representative pixel when the curvature value associate therewith is greater than the reference value.

In the method, when the luminance data is distributed in three-dimensions, the pixel extracting step may include the steps of: tracing the luminance contour plane in a luminance distribution function of the luminance data; obtaining a predetermined number of curvature values indicative of curvature of the luminance contour plane; and comparing the curvature values with a reference value to designate at least a pixel corresponding to one of the curvature values as a representative pixel when the curvature value associated therewith is greater than the reference value.

In the method, the pixel extracting step may include the steps of: tracing a luminance contour line in a luminance distribution function of the luminance data; and comparing a distance from a straight line connecting a first and a second pixel on the luminance contour line to a third pixel not on the luminance contour line with a reference value to designate the third pixel as a representative value when the distance is greater than the reference value.

In the method, when the luminance data is distributed in three dimensions, the pixel extracting step may include the steps of: tracing a luminance contour plane in a luminance distribution function of the luminance data; and comparing a distance from a plane connecting a first and a second pixel on the luminance contour plane to a third pixel not on the luminance contour plane with the reference value to designate the third pixel as the representative value when the distance is greater than the reference value.

In the method, the texture extracting step may include the steps of: orthogonally transforming an area including a spatial frequency in a luminance function of the luminance data to obtain a frequency spectrum pattern; and extracting, as the texture data, data of a border between at least a first and a second area wherein the absolute values of the frequency spectrum pattern and of frequency spectrum patterns of the first and second areas are different.

In the method, the decoding step may include the step of randomizing the sign of the coded texture data during decoding of the coded texture data.

In the method, the decoding step may include the step of randomizing a phase of the coded texture data during decoding of the coded texture data.

In the method, the reproducing step may include the step of designating luminance data of pixels except the representative pixels consisting of the video data based on an interpolation plane formed with the decided representative pixels.

In the method, when the video data is motion picture data, the texture data extracting step may include the steps of: selecting texture data of a first still image at a first period of time; and transferring the texture data of the first still data in accordance with moving vectors of the first still image and of a second still image at a second period of time different from the first period of time to obtain texture data of the second still image.

BRIEF DESCRIPTION OF THE DRAWINGS

FIG. 3 is a circuit block diagram for the multidimensional image compression and decompression method according to the present invention;

FIG. 11 is a circuit block diagram of the texture extractor used for the multi-dimensional image compression and decompression method according to the present invention;

FIG. 14 is a circuit block diagram of the texture reproducer used for the multi-dimensional image compression and decompression method according to the present invention;

DETAILED DESCRIPTION OF THE PREFERRED EMBODIMENT

The preferred embodiments of the multi-dimensional image compression and decompression method according to the present invention will be described with reference to drawings.

The method according to the present invention is directed to conducting effective compression and decompression of image data that spreads out two-dimensionally or three-dimensionally (including the time-axis). The image data to be processed by the method of the present invention includes an image of luminance data (black and white) and also a color image of lightness and chromaticity (hue and saturation). The following description discusses the multi-dimensional image compression of image data with respect to luminance only.

A still image is expressed by the equation (1):

$$z = f(x, y) \quad (1),$$

where z is the luminance in a still black and white image and x and y are horizontal and vertical dimensions of the image, respectively.

Further, a motion picture is expressed by the equation (2):

$$z = f(x, y, t) \quad (2),$$

wherein t is the time-axis.

when f is the multi-function, the luminance z in an image is expressed by the equation (3):

$$z = A_1 x + A_2 x^2 + \ldots + An\, x^n + B_1 y + B_2 y^2 + \ldots + Bn\, y^n + C_1 t + C_2 t^2 + \ldots + Cn\, t^n + D \quad (3).$$

Transmission of an image can be said to reproduce at a receiving side the luminance function expressed by the equation (3) determined at a transmission side. However, digital images are processed in general such that all table values in the table function are transmitted without analytical treatment of the luminance function. In conventional data compression and transmission, effective coding is conducted utilizing correlation between the table values or orthogonally transformed table values. However, there are few compression and transmission methods that directly select feature points of the luminance function by its analytical treatment.

The multi-dimensional image compression and decompression method according to the present invention conducts the following process to a still image of two- or three-dimensional (including the time-axis) luminance data.

Figure 1A:
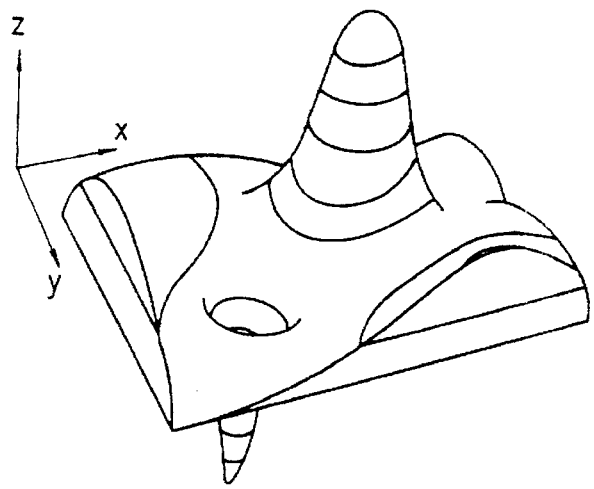
FIGS. 1A and 1B are illustrations for explaining the multi-dimensional image compression and decompression method according to the present invention.
Figure 2:
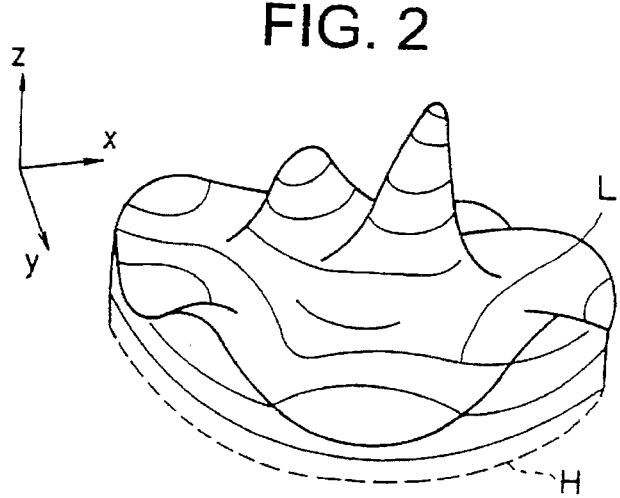
FIG. 2 is an illustration for explaining the tracing of the luminance contour line and the designating of feature points.

Luminance contour lines (planes in the case of three-dimensions) are selected as shown in FIGS. 1A and 2. Pixels are designated as feature points of the image in such a way that, at these pixels, the curvature of the selected lines (or planes) before and after the subject pixel exceeds a predetermined angle (i.e., at the representative pixels, the contour line changes direction by more than a predetermined amount) or differences between the luminance contour lines (planes) and approximate lines (or planes) are greater than a predetermined reference value. Data concerning positions and luminance values of the feature points only are used for transmission (recording) and image reproduction while neglecting luminance data of pixels unimportant for image reproduction.

With this method, large amounts of image data can be compressed. Further, areas of the luminance function with high spatial frequency components higher than a predetermined spatial frequency value are orthogonally transformed to have texture areas with equal and different absolute spectrum patterns. Texture data is then generated which pertains to data on spectrum and pixels on a border between texture areas of different absolute spectrum patterns. During decompression, the texture data is added to interpolation planes (or solids) designated by the feature points to have effectively a high quality decompressed image with the texture data.

FIG. 3 shows a circuit block diagram explaining the multi-dimensional image compression and decompression method according to the present invention.

The system of FIG. 3 includes a video signal generator (source) 1 for generating a video signal to be processed. The source 1 is that of a TV camera, VTR, etc., capable of generating a video signal. The system further includes an analog-to-digital converter 2, a video memory 3, a contour line tracer-feature point selector 4, a texture producer (texture extractor) 5, a coder-transmitter 6, a receiver-decoder 7 (reproducer-decoder), a texture reproducer 8, a luminance function reproducer 9, a video memory 10, a driver 11 and a monitor 12.

The principles of compression and decompression (reproduction) of image data in the present invention will be described before discussing the operation of the system of FIG. 3.

Points of an image are designated feature points as described later when curvature values indicative of curvature of the luminance contour lines (planes in three-dimensions) on the luminance function exceed a reference value or the distance separating the luminance contour lines from straight lines (planes) approximating the luminance contour lines (or planes) are greater than a predetermined reference value.

A pixel to be processed is deemed to be a feature point of an image when:

1. the curvature of a contour line (plane in three-dimension) which exists before and after the pixel to be processed exceeds a predetermined reference angle; or 2. the pixel to be processed is distant from an imaginary straight line drawn according to the contour line between a pixel already deemed to be a feature point and another pixel and the distance exceeds a predetermined reference distance.

Figure 4A:
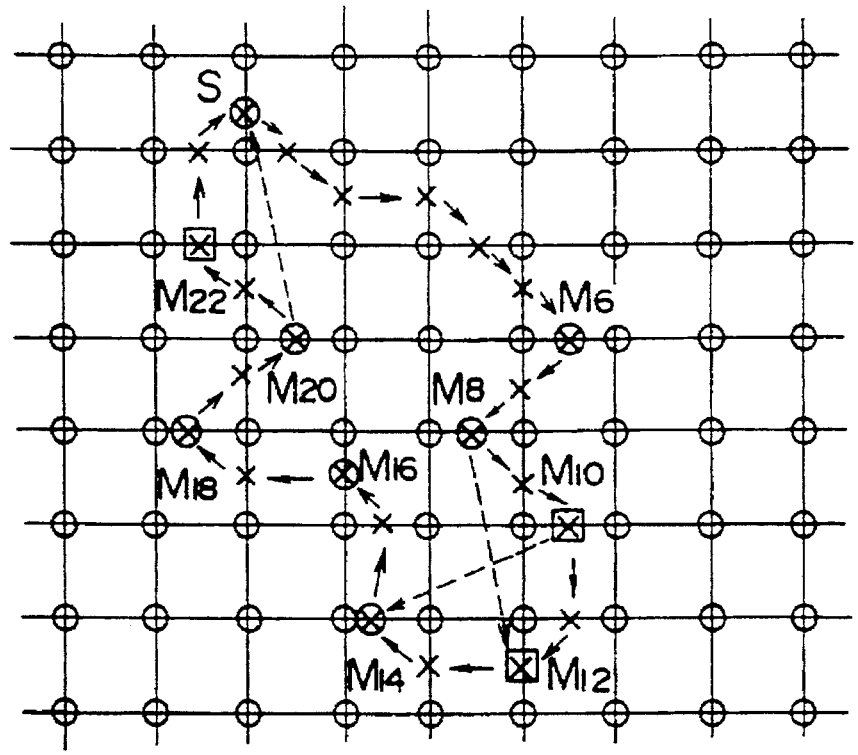
FIGS. 4a and 4B are illustrations for explaining the tracing of the luminance contour line and designating of the feature points.
Figure 4B:
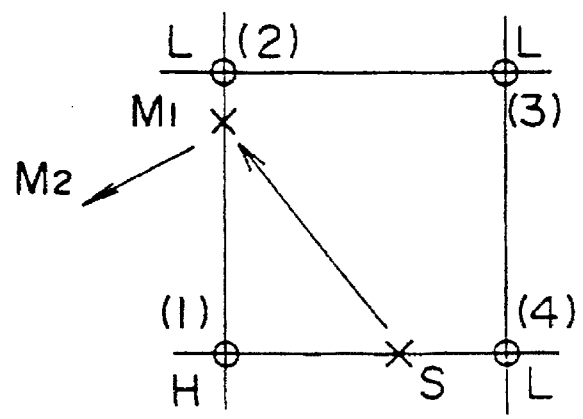

The method of designating feature points of an image to be compressed and decompressed using methods (1) or (2) will be discussed further in detail with reference to FIGS. 4A and 4B showing the luminance distribution function in a two-dimensional still image.

FIG. 4A shows a contour line in the luminance distribution function of a two-dimensional image, which is traced in the manner described hereinafter.

In FIG. 4B, points (1) to (4) are four pixels and their luminance values are expressed as H and L, which, in turn, represent high and low luminance values, respectively. Discussion will proceed with a point (pixel) S which is initially selected as a starting point. Since the point S is located between the pixels (1) and (4), the luminance value of the point S can be a proportionally distributed luminance value which depends upon the luminance values of the pixels (1) and (4).

A determination is made whether there is a point of the same luminance value as that of the point S in the order of the sides (1)–(2) (2)–(3), (3)–(4) of the square defined by the pixels (1) to (4), to thereby trace a luminance contour line that intersects the point S and other points of the same luminance value as that of the point S.

Firstly, a point $M_1$ is detected, on the side (1)–(2) as having the same luminance value as that of the point S. After the point $M_1$ is detected, the same step is repeated to detect other points (not shown) having the same luminance value as that of the point S. Accordingly, the luminance contour line is traced so as to intersect the point S and other points having the same luminance value as that of the point S. In tracing a luminance contour line, any side of the square that already crosses a luminance contour line already traced is neglected except the side (1)–(4) on which the starting point S exists.

As described above, a contour line of the luminance distribution function in a two-dimensional image as shown in FIG. 4A is traced by detecting points having the same luminance value as that of a predetermined starting point.

In FIG. 4A, points $M_6$, $M_8$, $M_{14}$, $M_{16}$, $M_{18}$ and $M_{20}$ on which a contour line traced with the starting point S suddenly changes its direction are designated as feature points according to the judging method (1) described above. After the point $M_8$ and then a point $M_{12}$ are detected as having the same luminance value as that of the point S, a point $M_{10}$ that is distant by a specific distance from an imaginary broken line $M_8$–$M_{10}$ is judged as a feature point according to the judging method (2) described above. The point $M_{12}$ and a point $M_{22}$ are also judged as feature points according to the method (2).

Since, the luminance distribution function in a two-dimensional image is replaced with contour lines on which only feature points exist, while neglecting other points not designated as feature points, highly compressed data can be transmitted or recorded by the multi-dimensional image compression and decompression method according to the present invention.

A decompression method is employed to reproduce an image by decompressing the highly compressed and transmitted(recorded) image data. By this method a luminance value is determined for a point(not necessarily corresponding to a pixel of an original image) in a decompressed image corresponding to a feature point, and the influences of feature points on peripheral points become weaker in proportion to the distance between the feature and peripheral points. Image data decompressing is conducted with straight line interpolation between feature points in one-dimension and with plane or solid interpolation in multi-dimension. The principle of such image data decompression will be described with reference to FIG. 5.

Figure 5:
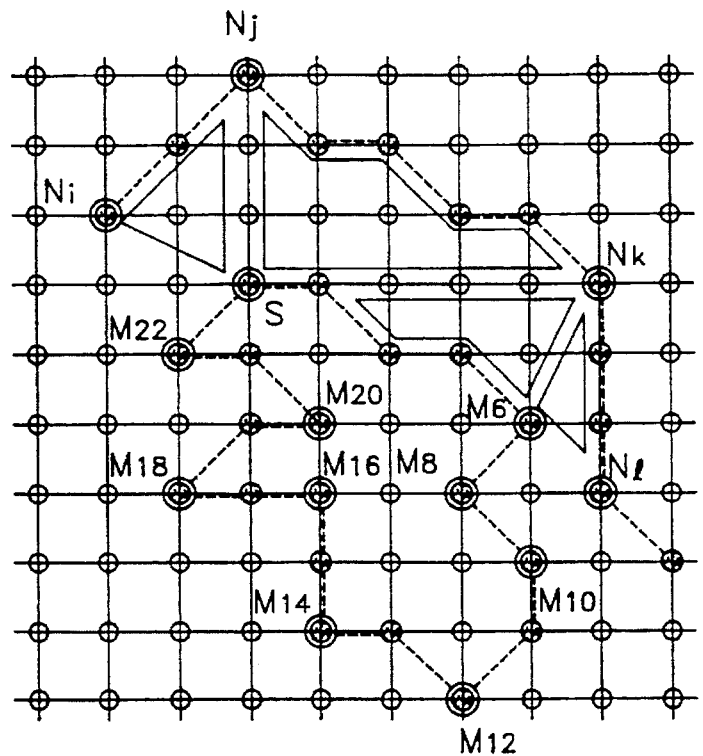
FIG. 5 is an illustration for explaining the luminance function interpolation.

FIG. 5 shows a luminance contour line for a group M of feature points reproduced on a video memory for reproduction using position data (addresses) of the feature points $M_6$, $M_8$, $M_{12}$, $M_{14}$, $M_{16}$, $M_{18}$, $M_{20}$ and $M_{22}$ and depicted with a broken line connecting these points. Another broken line connecting feature points $N_i$, $N_j$, $N_k$, and $N_l$ is a luminance contour line for a group N of feature points.

When the inner area between the contour lines of M and N groups of feature points is filled with luminance values of the N group, pseudo edge phenomenon occurs due to a difference in level between luminance values of the inner area and an area surrounded by the contour line of the M group. This results in a deterioration of the decompressed image. To avoid the pseudo edge phenomenon, the luminance values of the feature points of the M and N groups are plane-interpolated with luminance values obtained using an approximation calculation expressed by the equation (A):

$$za = \Sigma(zi/ri)/\Sigma(1/ri) \quad (A),$$

where a is a pixel in a decompressed image, ri is a distance from the pixel a to feature points an za and zi are luminance values of the pixel and the feature points, respectively.

Further, the relationship between the luminance value za and a luminance value zk of one of the feature points k is expressed by the interpolation equation (4), $$za = zk + \alpha k \times rk \quad (4),$$

where $\alpha$ is a proportionally constant the second term $\alpha k \times rk$ of the right side is a difference between the luminance values of the pixel a and the feature point k and is proportional to the distance r. The term $\alpha k \times rk$ further has positive and negative values depending on the proportionality constant $\alpha$. The total of proportionality constant $\alpha$ in the whole interpolation space is zero and is expressed by the equation (5).

$$\Sigma \alpha k = 0 \quad (5)$$

Deletion of $\alpha k$ in the equation (4) under the condition (5) results in the general interpolation equation (4) for the luminance value za of the pixel a.

The equation (4) shows that luminance values of all uninterpolated pixels in an image can be obtained by interpolation. These pixels need not correspond to an original image. The equation (4) however requires an impractical and large number of calculations due to the increase in feature points. An interpolated plane determined by three feature points close to an uninterpolate pixel. Interpolation triangles are obtained using groups of three feature points close to an uninterpolated pixel because one plane is determined by three points in space. Luminance values of pixel within each of the triangles made of the three feature points ($N_i$, $N_j$, and S), ($N_k$, $M_6$ and S) and ($N_j$, $N_k$ and S) are plane-interpolated by approximation calculation using the equation (A).

Determination of an interpolation plane for the interpolation method requires determination of three feature points which surround and are close to uninterpolated pixels. The principle of determining three feature points will be described with reference to FIG. 6.

Figure 6:
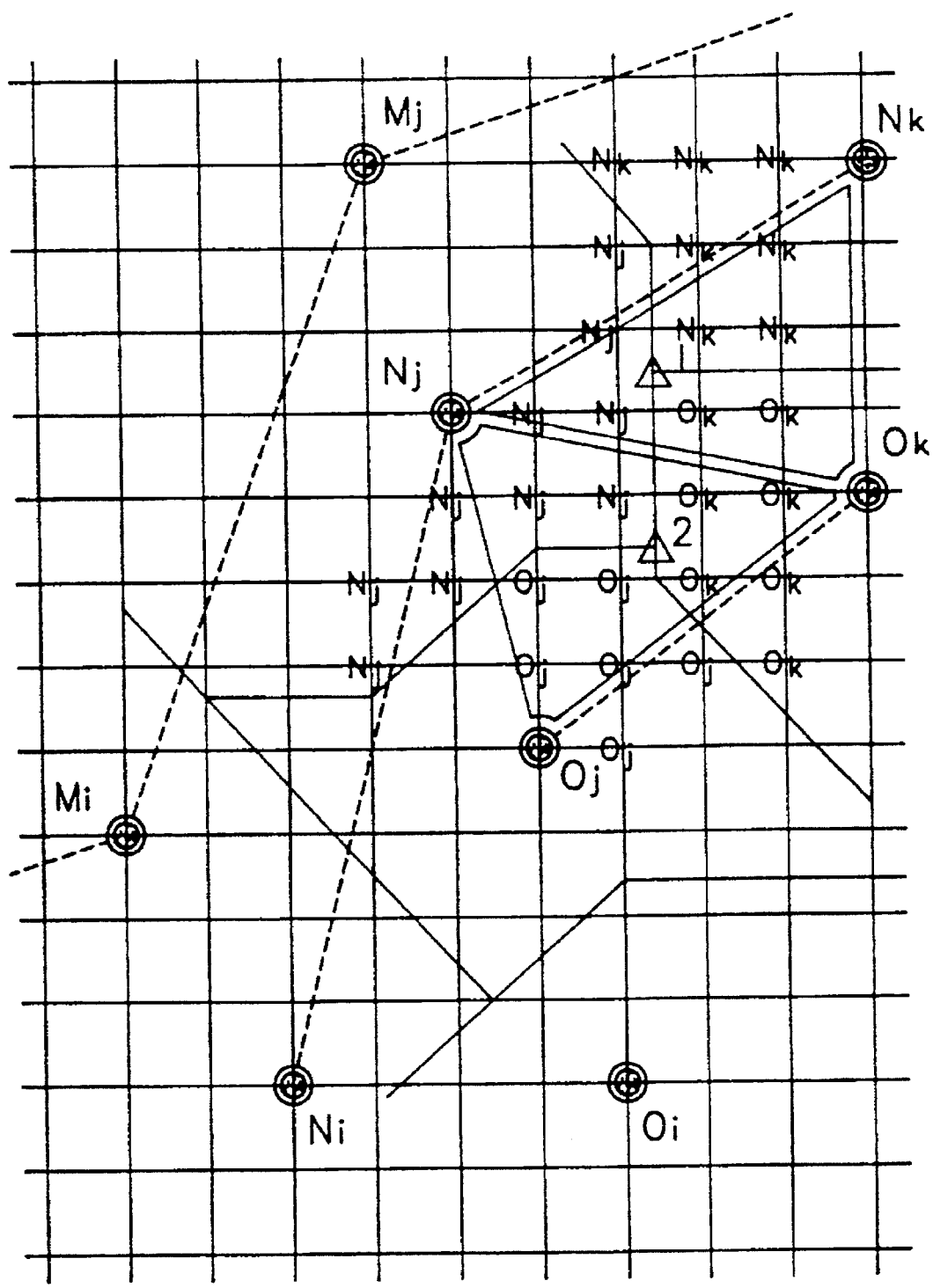
FIG. 6 is an illustration for explaining the feature point determination.

In FIG. 6, pixels $M_i$ and $M_j$ are the feature points on a luminance contour line of pixels with the same luminance value M; pixels $N_i$, $N_j$ and $N_k$ are the feature points on a luminance contour line of pixels with the same value N; and pixels $O_i$, $O_j$, and $O_k$ are the feature points on a luminance contour line of pixels with the same luminance value O. During decompression, data pertaining to each feature point group with the same luminance value is stored into a video memory for reproduction.

Figure 7:
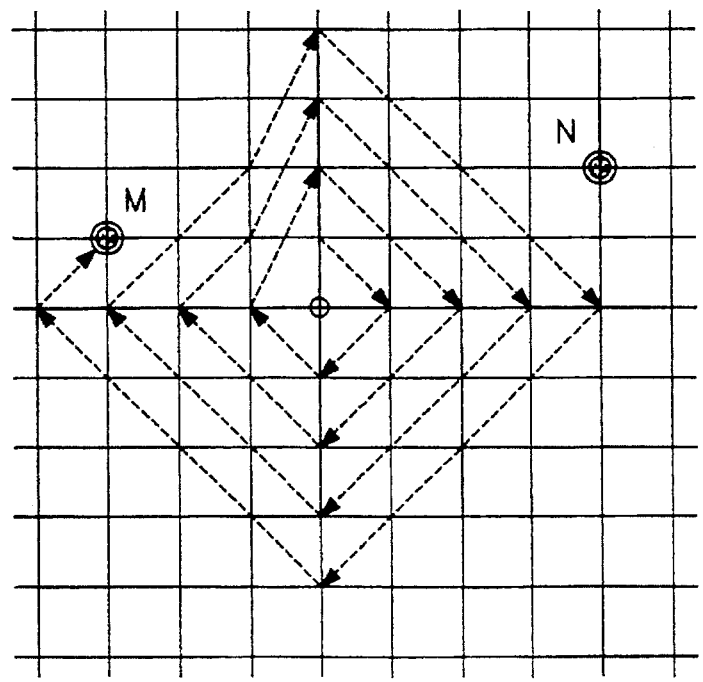
FIG. 7 is an illustration for explaining the feature point determination.

Described below is a process for determining which feature point a non-feature-point pixel is close to. FIG. 7 shows two pixels (feature points) M and N both close to a pixel P. Search starts at the pixel P along a spiral path depicted by a broken line and reaches the feature point M before the feature point N. A determination is thus made that the pixel P is located not close to the feature point N but rather is located close to the feature point M. Data of the pixel P is thus supplemented with a sign representing that the pixel P is located within an area of the feature point M.

FIG. 6 shows a plurality of non-feature-point pixels having indicia representing areas in which these pixels are located according to the method described above. The broken lines connecting the feature points are borders or limits of influence of the feature points.

For example, three pixels $N_j$, $N_k$, and $O_k$ in FIG. 6 are close to a border $\Delta 1$ of three areas. The pixels $N_j$, $N_k$ and $O_k$ are deemed to be the three closest feature points and a triangle defined by these points is designated as a luminance interpolation plane. Luminance values of pixels within the triangle made of the points $N_j$, $N_k$ and $O_k$ are represented by the luminance values in the luminance interpolation plane.

Next, three pixels, $N_j$, $O_j$ and $O_k$ in FIG. 6 are close to a border $\Delta 2$ of three areas. The pixels $N_j$, $O_j$ and $O_k$ are deemed the three closest feature points and a triangle defined by these points is designated a luminance interpolation plane. Luminance values of pixels within the triangle made of the points $N_j$, $O_j$ and $O_k$ are represented by the luminance values in the luminance interpolation plane.

By searching a pixel area under the influence of a feature point in an extended plane (solid in three-dimension), the three closest feature points (four in three-dimension) are detected from the border of the pixel area which is under the influence of the feature point.

The luminance function in decompression is thus determined using a small amount of feature point data and each luminance value of the untransmitted image data is represented by an interpolation value obtained using the equation (A) to thereby reproduce a whole image.

Figure 1B:
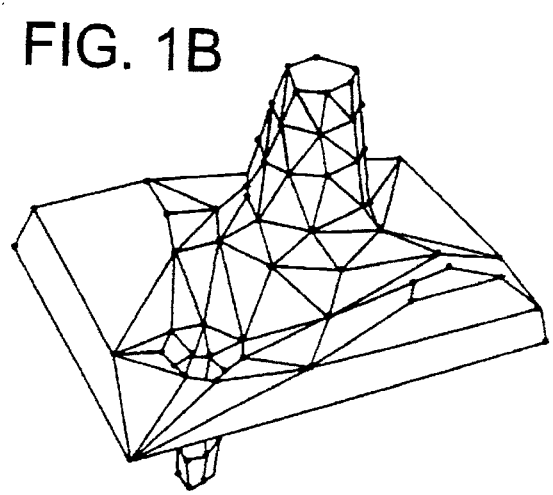

FIG. 1B shows an image reproduced using a luminance interpolation plane. An extended plane in two dimensions may be of a circle, square, rectangle or lozenge. In three-dimensions, an extended solid may be of a sphere, spherical ellipse, two circular cones connected to each other with bottoms as symmetrical faces and two pyramids connected to each other with bottoms as symmetrical faces.

Figure 8A:
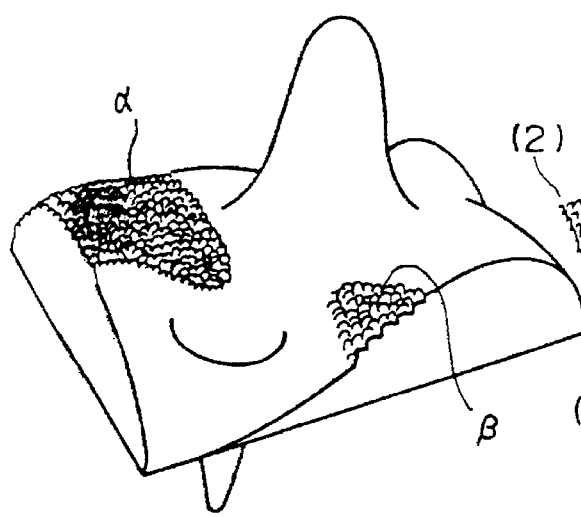
FIGS. 8A to 8D illustrate the multi-dimensional image compression and decompression method according to the present invention.

In a natural image, textures $\alpha$ and $\beta$ of an object exist as shown sin FIG. 8A added to the whole luminance functions structure shown in FIGS. 1A and 2. How an image is naturally reproduced depends on how the luminance function and textures are reproduced. The luminance interpolation plane of FIG. 1B however teaches that difficulty lies in reproduction of the textures due to the fact that fine portions of the luminance function of an extended image is decided by interpolation.

The multi-dimensional image compression and decompression method according to the present invention thus separately processes the luminance function and the textures. The luminance function is processed in the way described above.

Processing of the textures will now be described. An area of the luminance function having spatial frequency components higher than a predetermined reference spatial frequency is orthogonally transformed to obtain a frequency spectrum pattern. Texture areas having the same first frequency spectrum pattern are put into a first group. Further, texture areas having the same second frequency spectrum pattern are put into a second group. Texture data indicative of border pixels and frequency spectrum patterns is generated in each of the first and second groups. In decompression, the texture is added to an interpolation plane or solid determined by the close feature points described above.

Figure 8B:
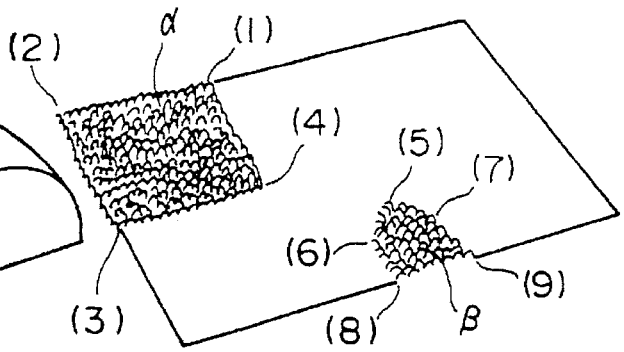
Figure 8C:
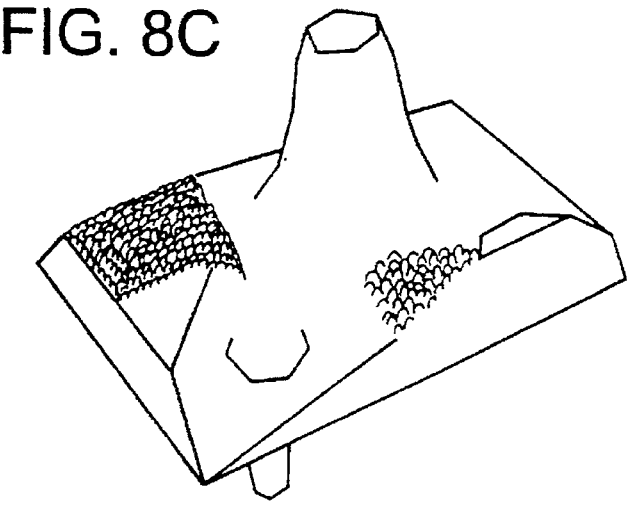

The luminance function including texture of FIG. 8A thus can be treated as a combination of the function of different frequency components as shown in FIGS. 1A and 8B. The multi-dimensional image compression and decompression method according to the present invention conducts first and second signal processing separately to two different frequency component functions according to their frequency bands: the first is described with reference to FIG. 1B; the second is, in FIG. 8B, for the texture $\alpha$ in the area surrounded by the border pixels (1) to (4) and the texture $\beta$ in the area surrounded by the border pixels (5) to (9).

Figure 8D:
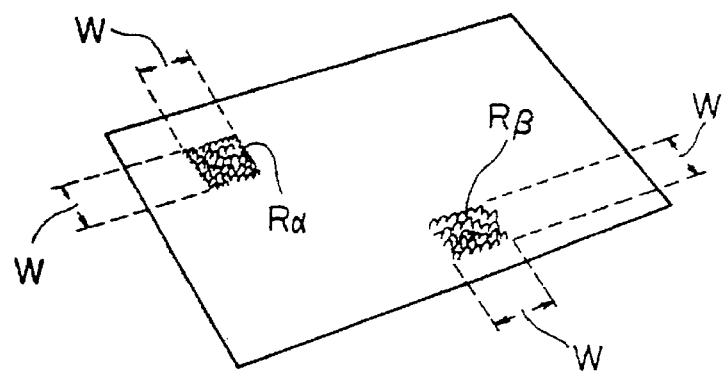

The texture data of an object image may be a combination of a frequency spectrum pattern obtained in the area of spatial frequency components higher than a predetermined reference value and border pixels of the area. In FIG. 8B, the area surrounded by a border line made of the pixels (1) to (4) is the texture area of $\alpha$ of constant texture with spatial frequency components higher than a first reference value. Further, the area surrounded by a border line made of the pixels (5) to (9) is the texture area of $\beta$ of constant texture with spatial frequency components higher than a second reference value different from the first value. Orthogonal transformation such as, discrete cosine transform (DCT) is made to portions R$\alpha$ and R$\beta$ of the areas $\alpha$ and $\beta$, respectively. FIG. 8D shows that the portions R$\alpha$ and R$\beta$ are orthogonally transformed with W in width and height. The textures thus obtained are used for transmission (recording) and reproduction of the texture of an image.

Figure 9A:
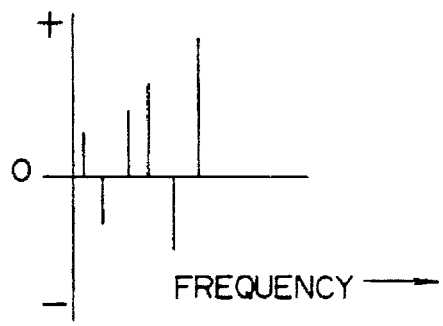
FIGS. 9A to 9H are frequency spectrum patterns for explaining the multi-dimensional image compression and decompression method according to the present invention.
Figures 9B, 9C, 9D:
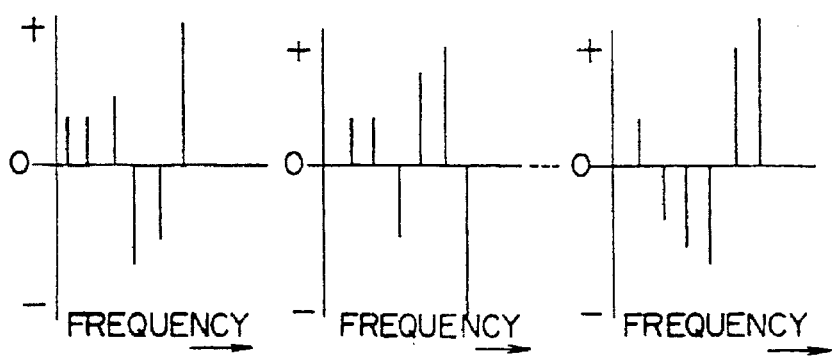
Figure 9E:
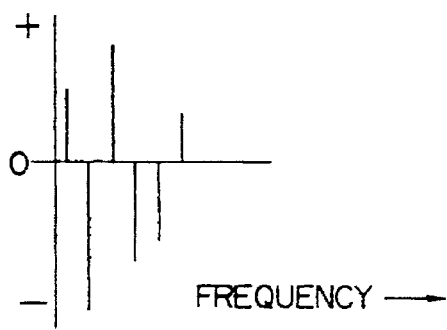
Figures 9F, 9G, 9H:
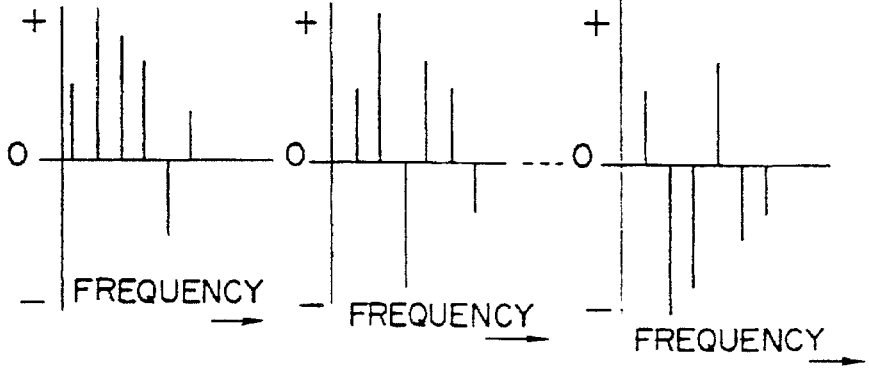

The frequency spectrum pattern obtained in each area is, one-dimensionally, as shown in FIG. 9A, a pattern with absolute values of the spectrum that monotonously increase as the frequency increases. Alternatively, the pattern is, as shown in FIG. 9E, a pattern with absolute values of the spectrum that monotonously decreases as the frequency increases.

In reproduction of an image, inverse orthogonal transformation, such as, inverse discrete cosine transform (IDCT) is made to the frequency spectrum patterns in the areas designated by the pixels (1) to (4) and (5) to (9). The results of the inverse orthogonal transform are added to the luminance function to obtain a reproduced image with texture.

The frequency spectrum patterns which are inverse orthogonally transformed in this manner correspond to the portions R$\alpha$ and R$\beta$ shown in FIG. 8B. In this manner this means that the textures obtain by the inverse orthogonal transform are not the texture of the whole areas designated by the pixels (1) to (4) and (5) to (9).

For example, if the whole area designated by the pixels (1) to (4) is filled with the texture obtained by inverse orthogonally transforming the frequency spectrum pattern corresponding to the portion R$\alpha$ of FIG. 8B, the whole area seems to have the same pattern repeatedly stuck on. This results in an unnatural image reproduction.

The method to avoid such a problem will be described with an example in that the frequency spectrum pattern corresponding to the portion R$\alpha$ (or R$\beta$) of FIG. 8B is the pattern shown in n FIG. 9A (or 9E). Generated first are frequency spectrum patterns (square areas of the same size) shown in FIGS. 9B and 9D (or 9F to 9H) by randomizing only the codes of the spectrum patterns with no change in the absolute values of the frequency spectrum pattern in FIG. 9A (or 9E). The texture of the whole area of the pixels (1) to (4) {or (5) to (9)} of FIG. 8B is then reproduced by sticking the generated frequency spectrum patterns shown in FIGS. 9B to 9D (or 9F to 9H) on the whole area designated by the pixels (1) to (4) {or (5) to (9)} of FIG. 8B.

When the texture of the whole area of the pixels (1) to (4) is reproduced according to this method, the edges of the portion Rα are sometimes reproduced as cross striped-like border lines because the edges of the portion Rα are not in succession with another portion Rα (not shown) in the luminance function. Since these cross striped-like border lines are pseudo-signals, such generation can be decreased by applying low band-pass characteristics to pixels close to the cross striped-like border lines.

According to these methods, the luminance function in decompression is determined based on a small amount of feature point data and the luminance values corresponding to untransmitted pixel data are interpolated with the luminance values of the luminance interpolation plane to reproduce a whole image. This reproduced image is of high quality because the texture data is added to the interpolation plane (solid) which, in turn, is determined using the case feature pints described above.

As understood from these descriptions, what is shared in compression and decompression is the luminance function of an image. The number of pixels is not necessarily the same in compression and decompression because in the present invention the positional data of feature pints of an image are of relative value with respect to the whole image. The feature point data detected by the present invention is reproduced according to the number of pixels (resolution) in decompression.

The multi-dimensional image compression and decompression method according to the present invention will further be described with reference to FIG. 3. The video signal generator (or source, such as a TV camera) 1 generates video signals under a particular standard for telecommunication. The generator 1 in this embodiment generates monochrome video signals of motion picture. The video signals are fed to the analog-to-digital converter 2 that converts the signals to digital signals 8 bits per pixel, the number of pixels per image being, for example, 512 and 480 in the horizontal and vertical directions.

The digital signals are fed to the video memory 3 that extracts a specific luminance contour line in an image for use in designating feature points and generates the texture data of the image. The video memory 3 includes two memory portions (not shown) and by switching these two memory portions, data writing and data reading that is executed for feature point designation are executed in parallel.

The output signals of the video memory 3 are fed to the contour line tracer/feature point selector 4 and the texture extractor 5. The former traces luminance contour lines of image data and designates feature points, while the latter extracts the texture data of an image and determines feature points.

The output signals of the contour line tracer/feature point selector 4 and the texture extractor 5 are fed to the coder-transmitter 6. The output signals are transformed into codes, such as Huffman codes, by the coder-transmitter 6 and transmitted to the receiver-decoder 7 decodes the codes and fees the decoded signals to the texture reproducer 8 and the luminance function reproducer 9. When a storage medium is employed instead of the transmission line, the coder-transmitter 6 and the receiver-decoder 7 may be recording and reproduction circuits, respectively.

The texture reproducer 8 reproduces the textures and stores them into the video memory 10. The luminance function reproducer 9 reproduces the two-dimensional luminance function in the state prior to compression using the fed feature point data. The reproduced two-dimensional luminance function is stored into the video memory 10.

The luminance values of pixels of the reproduced two-dimensional luminance function and the textures are red out from the video memory 10 and fed to the driver 11. The luminance values of pixels and the textures are transformed into analog sequential signals (video signals by the driver 11. The video signals are fed to the monitor 12 that displays an original image.

Figure 10:
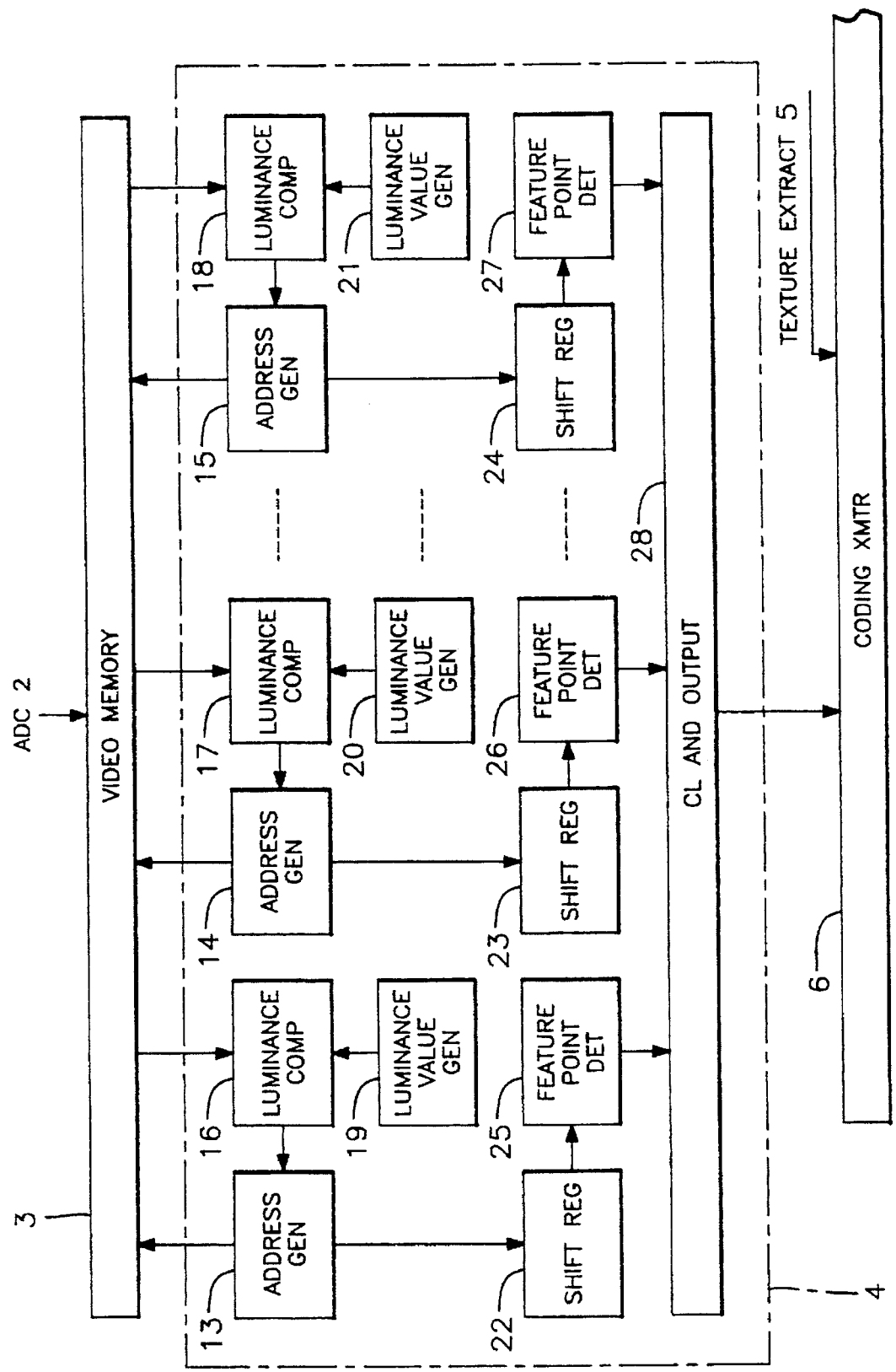
FIG. 10 is a circuit block diagram of the luminance contour tracer-feature point selector used for the multi-dimensional image compression and decompression method according to the present invention.

FIG. 10 shows the video memory 3 and a block diagram of the contour line tracer/feature point selector 4 connected by a plurality of transmission lines. The contour line tracer/feature point selector 4 includes address generators 13, 14 and 15; luminance comparators 16, 17 and 18; luminance value generators 19, 20 and 21; shift registers 22, 23 and 24; feature point detectors 25, 26 and 27 and a classify/output circuit 28. The number of generators, comparators, registers and detectors depends on the amount of data communicated with the video memory 3 via the transmission lines.

The address generators 13, 14 and 15 generate address data which is fed to the video memory 3. Luminance data is read from the storage fields in the video memory 3 at the addresses designated by the address data. The luminance data read from the video memory 3 and other luminance data generated by the luminance value generators 19, 20 and 21 are fed to the luminance comparators 16, 17 and 18.

The luminance comparators 16, 17 and 18 compare the luminance data from the video memory 3 and from the luminance value generators 19, 20 and 21 to feed the comparison results to the address generators 13, 14 and 15.

In response to the comparison results, the address generators 13, 14 and 15 generate new data (including intermediate addressed between pixel addresses) corresponding to, for example, the pixel $M_1$ shown in FIG. 4B, the new data being fed to the video memory 3.

The luminance data read from the storage fields in the video memory 3 at the addresses designated by the new data is fed to the luminance comparators 16, 17 and 18. Comparisons are made again by the luminance data fed from the memory 3 and from the luminance value generators 19, 20 and 21, the comparison results being fed to the address generators 13, 14 and 15.

By repeating these operations, addresses are sequentially generated at which exist luminance values approximately equal to the luminance values depicted by the luminance data generated by the luminance value generators 19, 20 and 21. When an address thus generated is an intermediate value between pixel addresses shown in FIGS. 4A and 4B, this address is replaced with an address close to the intermediate value and the operations are repeated.

The addresses thus generated by the address generators 13, 14 and 15 are fed to the shift registers 22, 23 and 24 that feed parallel outputs to the feature point detectors 25, 26 and 27. When each of the shift address registers 22, 23 and 24 accumulates address data for a specific number of pixels, such as 10 pixels, a new address is fed to and an old address is cleared from each of the feature point detectors 25, 26 and 27. At this timing, the feature point detectors 25, 26 and 27 designate feature points from pixels among the addresses according to the methods described above.

The addresses and luminance values of the feature points are fed to the classify/output circuit 28. The addresses and luminance values are classified according to their luminance contour lines each composed of the same luminance values and are output to the coder-transmitter 10 from the classify/output circuit 28 as the outputs of the contour line tracer/feature point selector 4.

The video memory 3 is of a multi-port configuration, or has a plurality of input and output ports because the contour line tracer/feature point selector 4 traces a plurality of luminance contour lines in parallel.

In timing, the contour line tracer/feature point selector 4 completes selection of feature points per image frame (or field in interlaced scanning) when it completes scanning of the frame. The output signals of the contour line tracer/feature point selector are fed to the coder-transmitter 6 that encodes the output signals into Huffman codes and transmits these codes to the receiver-decoder 7 via the transmission line. The feature point selection for a posterior image frame in the contour line tracer/feature point selector 4 is completed within the time necessary for coding into the Huffman codes and transmission of the Huffman codes to the receiver-decoder 7. The number of the feature points to be selected may be restricted by changing the reference angle or distance for feature point selection when the period of time for the coding and transmission exceed the scanning time per frame.

The texture extractor 5 includes, as shown in FIG. 11 an orthogonal transformer 51, a pattern memory 52, a border line detector 53, a feature point detector 54 and a pattern book 55. The orthogonal transformer 51 may be a two-dimensional discrete cosine transformer that easily randomizes codes pertaining to the spectrum patterns only. However, the orthogonal transformer 51 may be of any type that generates frequency spectrum patterns.

In FIG. 11, the digital signals read out from the video memory 3 are fed to the orthogonal transformer 5 that transforms the digital signals into the frequency spectrum patterns by two-dimensional discrete cosine transform per texture field. The frequency spectrum patterns are fed to the pattern memory 52 and the pattern book 55. Further fed to the pattern memory 52 are pattern numbers generated by the pattern book 55, the pattern numbers corresponding to patterns of high frequency components obtained by two-dimensional discrete cosine transform.

Upon completing the storage of the texture pattern data per frame into the pattern memory 52, the border line detector 53 detects borders of the fields which are associated with the same number and feeds border data to the feature point detector 54.

Figure 12:
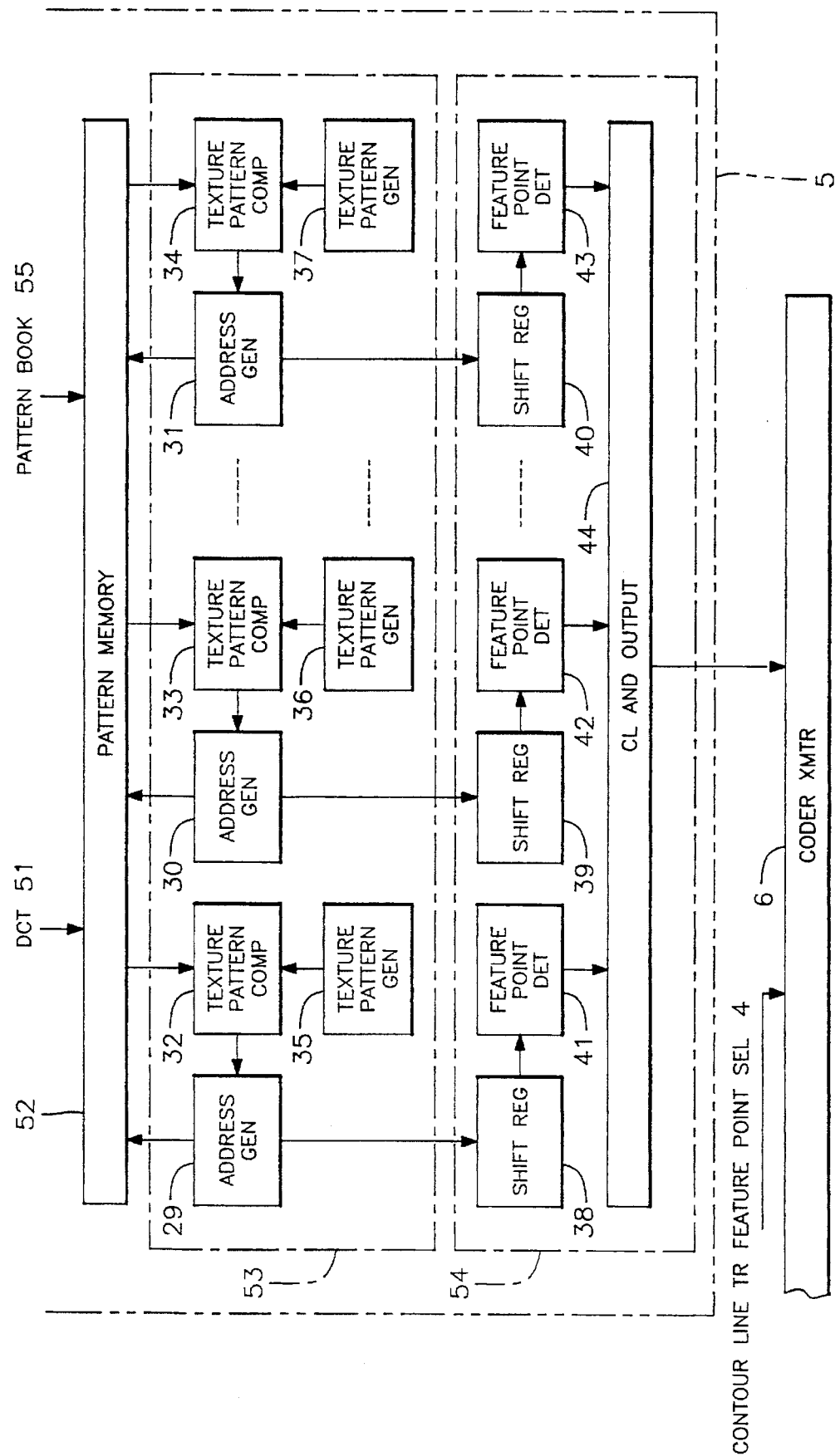
FIG. 12 is a circuit block diagram of the border line detector used for the multi-dimensional image compression and decompression method according to the present invention.

The border line detector 53 includes, as shown in FIG. 12, address generators 29 to 31, texture pattern comparators 32 to 34 (detectors), texture pattern number generators 35 to 37. The feature point detector 54 includes as shown in FIG. 12 shift registers 38 to 40, feature point detectors 41 to 43 and a classify/output circuit 44.

The border line detector 53 and the feature point detector 54 detect the border lines and feature points, respectively, in the same manner as the contour line tracer/feature point selector 4 for the luminance function.

In FIG. 12, positional data of feature points on a border line per texture field and pattern numbers corresponding to the inner border area are generated by the classify/output circuit 44 and fed to the coder-transmitter 6. The feature point data of an image to be compressed, which data is fed from the contour line tracer/feature point selector 4 and the positional data of feature points on a border line per texture field and pattern numbers corresponding to the inner border area, both of which are fed from the texture extractor 5, are transmitted from the coder-transmitter 6 to the receiver-decoder 7.

The receiver-decoder 7 decodes the transmitted codes and feeds decoded signals to the texture reproducer 8 and the luminance function reproducer 9.

Figure 13:
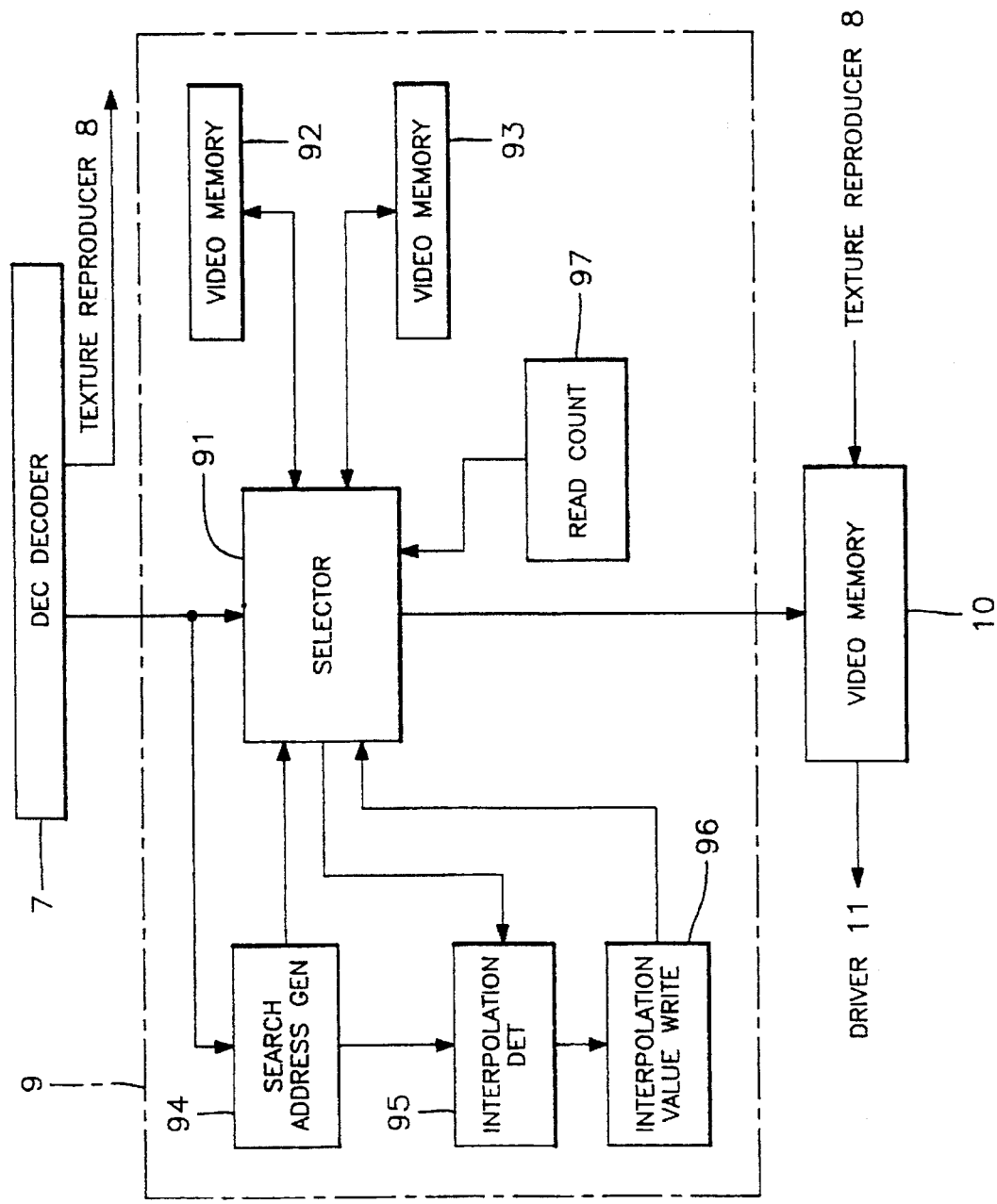
FIG. 13 is a circuit block diagram of the luminance function reproducer used for the multi-dimensional image compression and decompression method according to the present invention.

The luminance function reproducer 9 includes, as shown in FIG. 13, a selector 91, video memories 92 and 93, a search address generator 94, an interpolation plane detector 95, an interpolation value writer 96 and a read controller 97. Using this configuration, the luminance function reproducer 9 reproduces the two-dimensional luminance function in a decompressed state using the feature point data fed from the receiver-decoder 7.

When the feature point data, that is, addresses and luminance values of the feature points, is fed to the luminance function reproducer 9, the feature point data is fed to and stored into either of the memories 92 and 93. These memories are selectable for high-speed data decompression by simultaneous operations of decompression and displaying the decompressed data by means of the selected memories. The search address generator 94 generates addresses of non-feature point pixels stored into the memory 92 (or 93), traces the feature points closest to the address-generated pixels by the method already described and puts the signs into the address-generated pixels, the signs representing which feature point's area includes the particular address-generated pixels (attribute area of the feature points).

The interpolation plane detector 95 reads out the attribute area from the memory 92 (or 93) to trace the area border to select three feature points for interpolation determination among the close area-signed feature points.

The interpolation value writer 96 calculates the interpolation values in the inner area of an interpolation triangle determined in the memory 92 (or 93) and writes the interpolation values into the memory 92 (or 93) to represent the luminance values of the non-feature point pixels in the inner area with the interpolation values.

The read controller 97 reads the pixel data stored in the same memory 92 (or 93) where the foregoing interpolation values are written not the other memory 93 (or 92) to feed the pixel data to the video memory 10.

The texture reproducer 8 shown in FIG. 14 includes a feature point interpolator 81, an area generator 82, and inner border mixer 83, a pattern book 84, a code randomizer 85 and an inverse orthogonal transformer 86 (inverse two-dimensional discrete cosine transformer).

The feature point interpolator 81 reproduces border data from the feature point data fed from the receiver-decoder 7 and feeds the border data to the area generator 82 that generates the area data. The generated area data is fed to the inner border mixer 83.

The pattern book 84 generates the frequency spectrum patterns corresponding to the pattern numbers fed from the receiver-decoder 7. The generated frequency spectrum patterns are fed to the code randomizer 85 that randomizes only the codes of the frequency spectrum patterns. The randomized codes are fed to the inverse orthogonal transformer 86.

The inverse orthogonal transformer 86 inversely transforms the frequency spectrum pattern in which codes only are randomized by two-dimensional discrete cosine transformation to thereby reproduce textures. The reproduced textures are fed to the inner border mixer 83 that puts the randomized textures into the determined texture display area to reproduce the texture area data. The reproduced texture area data is stored into the video memory 10. During reproduction of the texture area data by putting the randomized textures into the texture display area, the low-band pass filtering characteristics are applied to the pixel data close to the cross striped borders already described to avoid display of the cross striped borders.

The driver 11 in FIG. 3 reads the luminance value and texture data from the video memory 10 as sequential video signals with texture data under a specific standard for telecommunication. The driver 11 includes a digital-toanalog converter (not shown) for converting the sequential video signals into analog video signals and adding blanking and synchronizing signals to the analog video signals. The blanking and synchronizing signal-added analog video signals are fed to the monitor 12 to display a reproduced image on a screen.

The multi-dimensional image compression and decompression method described so far is for reproducing the two-dimensional luminance function. The method according to the present invention is further applicable to the reproduction of three-dimensional luminance functions by selecting feature points over a plurality of sequential images on the time axis.

Figure 15:
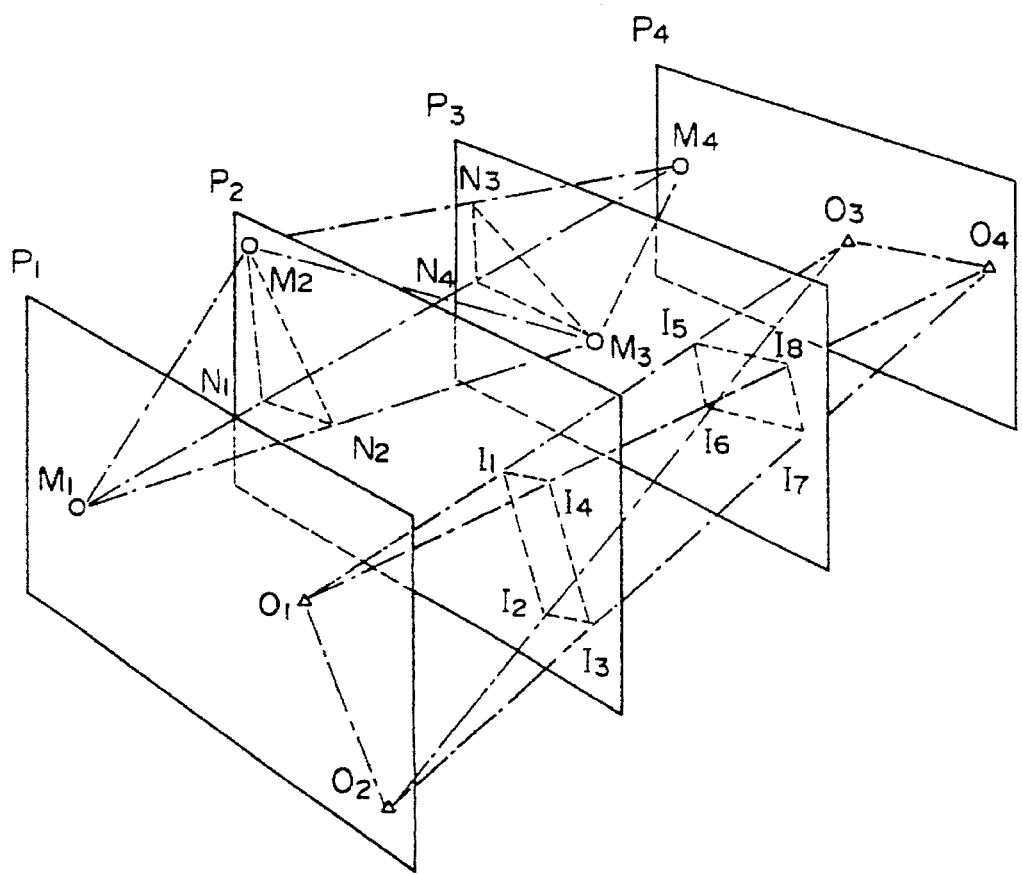
FIG. 15 is an illustration for explaining the multi-dimensional image compression and decompression method according to the present invention in three-dimension.

FIG. 15 explains determination of the luminance values of non-feature point pixels using an interpolation solid determined by feature points which, in turn, are designated using three-dimensionally distributed image data. Images (frames) $P_1$ to $P_4$ in FIG. 15 are still images arranged over the time-axis and as a whole the images are three-dimensionally distributed. Contour lines are obtained by tracing the two-dimensional luminance function in the still images $P_1$ to $P_4$ and contour planes can be obtained by extending the contour lines. The points $M_1$ to $M_4$ are feature points which are designated by satisfying the condition that, at these points, the curvature of the contour plane before and after the subject point exceeds a predetermined angle (i.e., the contour plane changes direction by more than a predetermined amount) or the distance between the contour plane and an approximate plane of the contour plane is greater than a reference value. When the feature points are three-dimensionally close to a particular pixel, the interpolation solid is defined by the feature points $M_1$ to $M_4$. Triangles made of points ($M_2$, $N_1$ and $N_2$) an ($M_3$, $N_3$ and $N_4$) are the projections on the still images $P_2$ and $P_3$, respectively, of the interpolation solid defined by the feature points $M_1$ to $M_4$.

The luminance values of the apexes of each triangle are determined by interpolation calculations using the luminance value of the apexes of the interpolation solid defined by the feature points $M_1$ to $M_4$. Accordingly, luminance values of pixels existing in each triangle are determined by the same method as that used in determining luminance values of untransmitted pixels using the interpolation plane in the two-dimensional image data as described above.

In FIG. 15, suppose that, without detection of three-dimensional feature points as described above, feature points ($O_1$ and $O_2$) and ($O_3$ and $O_4$) are obtained on the still images $P_1$ and $P_4$, respectively, using the two-dimensional feature point detection technique described above. When these feature points $O_1$, $O_2$, $O_3$ and $O_4$ are the three-dimensionally close points, an interpolation solid is defined by these points. The projections on the still images $P_2$ and $P_3$ of the interpolation solid are rectangles made of points ($I_1$, $I_2$, $I_3$ and $I_4$) and ($I_5$, $I_6$, $I_7$ and $I_8$). Since a rectangle may be divided into triangles, a single interpolation plane can be defined also in this case. Accordingly, luminance values of pixels existing in each triangle are determined by the same method as that used in determining luminance values of untransmitted pixels using the interpolation plane in the two-dimensional image data as described above.

Figure 16:
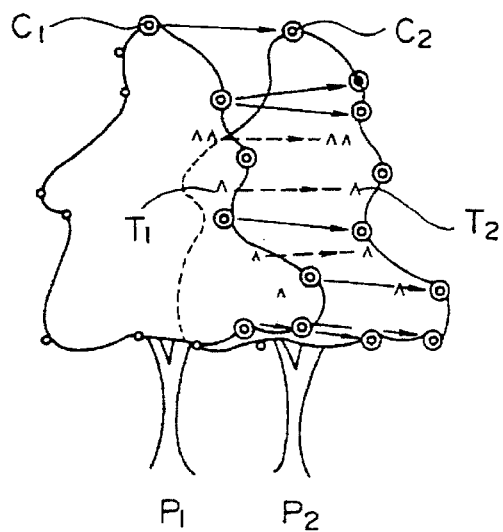
FIG. 16 is an illustration for explaining the multi-dimensional image compression and decompression method according to the present invention for motion picture.

FIG. 16 explains texture data processing for use when the multi-image compression and decompression method according the present invention is applied to processing of a three-dimensional image. Depicted in FIG. 16 is a moving picture of a tree viewed from a running train. A tree $P_1$ is an image at a specific period of time and has textures corresponding to its leaves. Depicted of the tree $P_1$ are a portion pattern (texture) $T_1$ and a point $C_1$ which is one of the feature points on a texture border. Further depicted in FIG. 16 is a tree $P_2$ corresponding to an image at a specific period of time following the occurrence of the tree $P_1$ and also having textures corresponding to the leaves. Depicted in the tree image $P_2$ are a portion pattern (texture) $T_2$ and a point $C_2$ which is one of the feature points on a texture border.

Correspondence between feature points, such as, the points $C_1$ and $C_2$ is achieved by obtaining motion vectors of the images $P_1$ and $P_2$. With such correspondence, the texture $T_2$ can be obtained by transferring and copying the texture $T_1$ in the direction of the motion vector and its magnitude, without reproducing the textures $T_1$ and $T_2$, separately. Textures for images existing between the images $P_1$ and $P_2$ are represented by positional interpolation values.

Accordingly, during compression of an image moving from $P_1$ to $P_2$, transfer of the luminance function only of a decompressed (reproduced) image can be reproduced with no change in naturalness of the moving image because the texture always follows the transfer of the luminance function with no random reproduction of the texture during the transfer. In three-dimensional compression, thus, there is no need to transmit texture data for a plurality of images following an initial image (a still image at a specific period of time). This need is obviated by transmitting texture data, such as, texture (pattern) numbers in a representative area of a specific texture in the still image and copying the texture data for the plurality of images.

Accordingly, the three-dimensional image compression in the present invention can achieve higher compression ratios that the two-dimensional image compression, with no deterioration of motion pictures by transferring texture data following the luminance function representing edges of a moving object.

The multi-dimensional image compression and decompression method according the present invention is also applicable to video signals consisting of a plurality of signals, such as, a composite signal of three primary colors or of luminance and color difference signals. In this case, what is shared by the circuit elements described above are the luminance contour lines in the luminance function and addresses of texture-border lines and feature points for the plurality of signals.

As described above, the multi-dimensional image compression and decompression method according to the present invention is directed to extracting feature points (pixels) on luminance contour lines of the luminance function of an image to obtain compressed image data. For texture data which may be neglected, it representative orthogonally transformed values or their numbers and feature points on texture border lines only are transmitted per texture data.

In decompression, the two- or three-dimensional luminance data is interpolated for reproduction and, for representative orthogonally transformed values of the texture, the order and their absolute values are stored and their codes or phase are randomized. Accordingly, luminance values in texture areas of the same luminance level except a representative plane can be determined and a high quality image can be transmitted using a high compression ratio.

For the texture of the luminance functions distributed in three dimensions, the texture is transferred and copies on a plurality of images which are to be interpolated in their directions. Accordingly, the luminance function of a decompressed image only is transferred to obtain a high quality image without problems such as wherein the texture does not follow the transfer of the luminance function or transfer of the texture is randomly reproduced to change the naturalness of a moving picture.

In three-dimensional compression, texture numbers (pattern numbers), for example, in a representative area of a specific texture of a still image at a period of time are transmitted, and textures of the following plurality of images are obtained by transferring and copying the specific texture in their directions, thus eliminating the transmission of the textures of the images.

Accordingly, the three-dimensional compression technique can achieve higher compression ratios than that of the two-dimensional compression technique and obtain a high quality moving picture because texture can be transmitted so as to follow the luminance function depicting edges of a moving object.

The multi-dimensional image compression and decompression method according to the present invention is also applicable to video signals consisting of a plurality of signals, such as, a composite signal of three primary colors or of luminance and color difference signals. In this case, what are shared by the circuit elements described above are the luminance contour lines in the luminance function and addresses of texture-border lines and feature points for the plurality of signals.

What is claimed is:

1. A method of compressing and decompressing a multi-dimensional image, wherein video data including luminance data distributed at least in two dimensions is compressed to become codes, the codes being decompressed to reproduce analog video data, the method comprising the steps of:

extracting, on the basis of luminance contour lines in the luminance data, a specific number of representative pixels from a plurality of pixels which constitute a digital signal representing the video data;

extracting texture data from the digital signal;

coding the representative pixels and texture data;

decoding the coded representative pixels and the texture data; and reproducing the video data using the decoded representative pixels and the texture data, wherein luminance data of pixels other than the representative pixels comprises video data reproduced on the basis of an interpolation plane defined by the decoded representative pixels, wherein the pixel extracting step includes the steps of:

tracing the luminance contour lines in a luminance distribution function of the luminance data;

obtaining curvature values indicative of curvature of the luminance contour lines;

comparing curvature values with a reference value; and choosing at least a pixel corresponding to one of the curvature values as one of said representative pixels when the curvature value associated therewith is greater than the reference value.

2. The method according to claim 1, wherein the coding step includes the step of orthogonally transforming the digital signal using a discrete cosine transform.

3. The method according to claim 1, the decoding step comprising the step of randomizing whether the coded texture data is positive or negative during decoding of the coded texture data.

4. The method according to claim 1, the decoding step comprising the step of randomizing a phase of the coded texture data during decoding of the coded texture data.

5. A method of compressing and decompressing a multi-dimensional image, wherein video data including luminance data distributed at least in two dimensions is compressed to become codes, the codes being decompressed to reproduce analog video data, the method comprising the steps of:

extracting, on the basis of luminance contour lines in the luminance data, a specific number of representative pixels from a plurality of pixels which constitute a digital signal representing the video data;

extracting texture data from the digital signal;

coding the representative pixels and texture data;

decoding the coded representative pixels and the texture data; and reproducing the video data using the decoded representative pixels and the texture data, wherein luminance data of pixels other than the representative pixels comprises video data reproduced on the basis of an interpolation plane defined by the decoded representative pixels, wherein when the luminance data is distributed in three-dimensions, the pixel extracting step comprises the steps of:

tracing luminance contour planes in a luminance distribution function of the luminance data;

obtaining curvature values indicative of curvature of the luminance contour planes; and comparing said curvature values with a reference value; and choosing at least a pixel corresponding to one of the curvature values as one of said representative pixels when the curvature value associated therewith is greater than the reference value.

6. A method of compressing and decompressing a multi-dimensional image, wherein video data including luminance data distributed at least in two dimensions is compressed to become codes, the codes being decompressed to reproduce analog video data, the method comprising the steps of:

extracting, on the basis of luminance contour lines in the luminance data, a specific number of representative pixels from a plurality of pixels which constitute a digital signal representing the video data;

extracting texture data from the digital signal;

coding the representative pixels and texture data;

decoding the coded representative pixels and the texture data; and reproducing the video data using the decoded representative pixels and the texture data, wherein luminance data of pixels other than the representative pixels comprises video data reproduced on the basis of an interpolation plane defined by the decoded representative pixels, the pixel extracting step comprising the steps of:

tracing a luminance contour line in a luminance distribution function of the luminance data; and comparing a distance with a reference value, said distance being from a straight line connecting a first and a second pixel on the luminance contour line to a third pixel not on the luminance contour line, to designate the third pixel as one of said representative pixels when the distance is greater than the reference value.

7. A method of compressing and decompressing a multi-dimensional image, wherein video data including luminance data distributed at least in two dimensions is compressed to become codes, the codes being decompressed to reproduce analog video data, the method comprising the steps of:

extracting, on the basis of luminance contour lines in the luminance data, a specific number of representative pixels from a plurality of pixels which constitute a digital signal representing the video data;

extracting texture data from the digital signal;

coding the representative pixels and texture data;

decoding the coded representative pixels and the texture data; and reproducing the video data using the decoded representative pixels and the texture data, wherein luminance data of pixels other than the representative pixels comprises video data reproduced on the basis of an interpolation plane defined by the decoded representative pixels, wherein, when the luminance data is distributed in three dimensions the pixel extracting step comprises the steps of:

tracing a luminance contour plane in a luminance distribution function of the luminance data; and comparing a distance with a reference value, said distance being from a plane connecting a first and a second pixel on the luminance contour plane to a third pixel not on the luminance contour plane, to designate the third pixel as one of said representative pixels when the distance is greater than the reference value.

8. A method of compressing and decompressing a multi-dimensional image, wherein video data including luminance data distributed at least in two dimensions is compressed to become codes, the codes being decompressed to reproduce analog video data, the method comprising the steps of:

extracting, on the basis of luminance contour lines in the luminance data, a specific number of representative pixels from a plurality of pixels which constitute a digital signal representing the video data;

extracting texture data from the digital signal;

coding the representative pixels and texture data;

decoding the coded representative pixels and the texture data; and reproducing the video data using the decoded representative pixels and the texture data, wherein luminance data of pixels other than the representative pixels comprises video data reproduced on the basis of an interpolation plane defined by the decoded representative pixels, the texture extracting step comprising the steps of:

orthogonally transforming an area in a luminance function associated with the luminance data, the area including a spatial frequency component higher than a reference spatial frequency to obtain frequency spectrum patterns; and extracting data of a border between at least a first and a second area having different absolute values of the frequency spectrum patterns and extracting data of the frequency spectrum patterns of the first and second areas as the texture data.

9. The method according to claim 8, the texture extracting step comprising the steps of:

gathering areas each having a frequency spectrum pattern whose absolute value is equal to the absolute value of the first or second areas into a first or a second group; and representing borders between areas in each of the first and second groups with representative values.

10. The method according to claim 8, comprising the step of selecting a predetermined frequency spectrum pattern based on the representative values.

11. A method of compressing and decompressing a multi-dimensional image, wherein video data including luminance data distributed at least in two dimensions is compressed to become codes, the codes being decompressed to reproduce analog video data, the method comprising the steps of:

extracting, on the basis of luminance contour lines in the luminance data, a specific number of representative pixels from a plurality of pixels which constitute a digital signal representing the video data;

extracting texture data from the digital signal;

coding the representative pixels and texture data;

decoding the coded representative pixels and the texture data; and reproducing the video data using the decoded representative pixels and the texture data, wherein luminance data of pixels other than the representative pixels comprises video data reproduced on the basis of an interpolation plane defined by the decoded representative pixels, wherein, when the video data is motion picture data, the texture data extracting step comprises the steps of:

selecting texture data of a first still image at a first period of time; and transferring the texture data of the first still image in accordance with motion vectors of the first still image and of a second still image at a second period of time different from the first period of time to obtain texture data of the second still image.

* * * * *